June 9, 1931.  H. W. JOHNSON  1,809,126
METAL WORKING TOOL
Filed Aug. 20, 1928

INVENTOR
Herman W. Johnson
By Ralph Kalish
ATTORNEY

Patented June 9, 1931

1,809,126

UNITED STATES PATENT OFFICE

HERMAN W. JOHNSON, OF ST. LOUIS, MISSOURI, ASSIGNOR TO STILES-HERMAN MANUFACTURING COMPANY, OF ST. LOUIS, MISSOURI, A CORPORATION OF MISSOURI

METAL-WORKING TOOL

Application filed August 20, 1928. Serial No. 300,800.

This invention relates generally to metal-working tools and, more particularly, to a certain new and useful improvement in tools especially adapted for rolling out dents and the like in automobile fenders, my invention having for its chief object the provision of a tool of the type and for the purpose stated which is simple and inexpensive in construction, compact and durable, readily engageable with the fender, conveniently and easily operatively manipulated, and efficient in the performance of its intended functions.

And with the above and other objects in view, my invention resides in the novel features of form, construction, arrangement, and combination of parts hereinafter described and pointed out in the claims.

In the accompanying drawings,—

Figure 1:
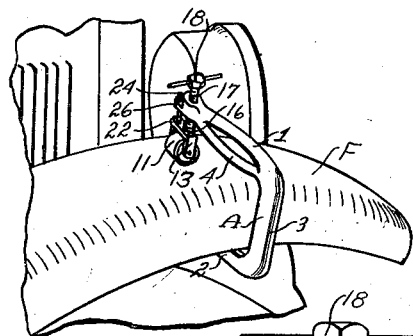
Figure 1 is a reduced perspective view of a fender-rolling tool of my invention, illustrated as in working operation upon a fender.
Figure 3:
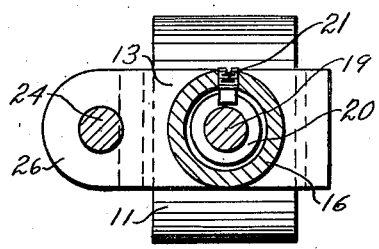
Figure 3 is an enlarged detail section of the tool, taken approximately on the line 3—3, Figure 2.
Figure 2:
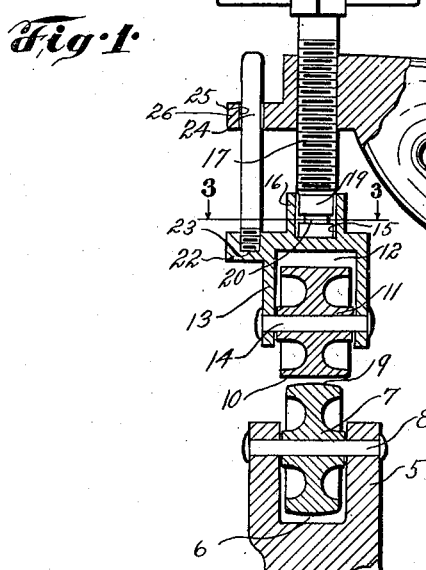
Figure 2 is an elevational view, partly broken away and in section, of the tool.

Referring now more in detail and by reference characters to the drawings, which illustrates practical embodiments of my invention, A designates the frame or body of the tool, which is constructed of any suitable material, such, for example, as rigid, lightweight metal, and which has approximately the form or shape of the letter C, the frame or body A of the tool of Figures 1 and 2 comprising suitably spaced cross-members or arms, 1, 2, preferably rigidly jointed at one end by a connecting-piece 3. Re-enforcing the upper arm 1, is a preferably integral somewhat arcuate brace 4. In the tool A of Figures 1 and 2, the lower arm 2 projects obliquely from the connecting-piece 3 toward the upper arm 1, while in the tool A' of Figure 4, the lower arm 2' has more exactly the curvature of the lower portion of the letter C; otherwise the tools A and A' are similar in structure, and hence a description of one will equally apply to the other.

At its free end, the arm 2 has an extension 5 presented toward the free end of the arm 1, and formed in the extension 5 is a recess 6 approximately of U-shape in section, as shown, for accommodating a roller 7 disposed for rotation therein as by means of a supporting shaft 8 having a bearing in the spaced walls of the recess 6, as best seen in Figure 2.

For purposes shortly appearing, the roller 7 has an arcuate periphery, as at 9, which is preferably of reduced width relatively to the approximately straight periphery 10 of a co-operating opposed roller 11, which is disposed for rotation in a similar approximately U-shaped recess 12 of a bracket 13 and supported for such rotation as by means of a shaft 14 having a bearing in the spaced walls of the recess 12, also as best seen in Figure 2.

Presented outwardly from the bight of the bracket 13 and having a recess 15 in opposed relation to recess 12, is a boss 16. Fitted for threaded adjustment in the free end of arm 1, is a screw-member 17 having its head-end 18 presented outwardly of the arm 1 and its opposite end 19 presented toward the bracket 13, said screw-end 19 being non-threaded and fitting in the boss 16, as likewise best seen in Figure 2. At its end 19, the screw 17 has a circumferential slot or groove 20, and seated in the bracket 13 and engaging in the groove 20, is a set-screw 21 for securing the member 17 and bracket 13 together in such manner that, upon adjustment of the screw-member 17, the bracket 13 and its supported roller 11 will be shifted toward or from the lower roller 7 to meet working conditions.

Projecting laterally from the bracket 13, is a lug 22 provided with a threaded recess 23 to seat the threaded end of a short staff or bar 24 freely slidable, on adjustments of the screw-member 17, in an aperture 25 provided in an extension 26 presented forwardly from the free end of arm 1, whereby the bracket 13 and its carried roller 11 are firmly held from turning or rotatory movement relatively to the lower arm 2 both during adjustments and working operations thereof.

Figure 4:
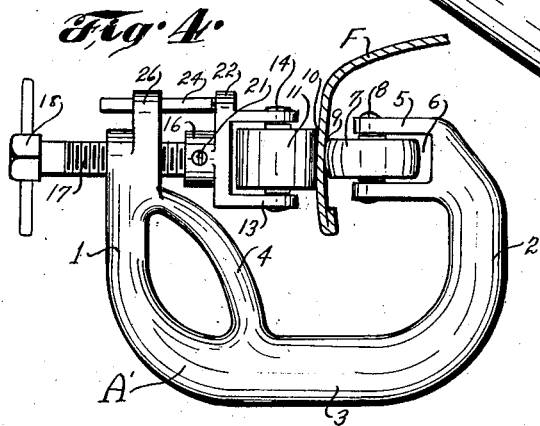
Figure 4 is a view, somewhat similar to Figure 1, of a slightly modified tool of my invention.

As so constructed, some of the operative functions of the tool are illustrated in Figures 1 and 4. The upper roller 11 being first adjustably shifted away from the lower roller 7, the tool is readily mounted operatively upon the fender F, with the arms 1 and 2 embracingly disposed upon opposite sides thereof, when the roller 11 is shifted toward the lower roller 7 and the fender F engaged therebetween. The tool is now through and by manual manipulation of the frame A reciprocated longitudinally or lengthwise of the so-engaged fender F, the rollers 7 and 11 at their differently shaped and sized peripheries 9 and 10 co-operating in effecting removal from the fender F of dents and the like. I may add that the peculiar, novel C shape or form of the frame A of the tool enables both facile engagement of the tool with the fender and manual manipulation of the tool lengthwise of the fender throughout both the body and rim or margin thereof, without necessitating removal of the fender from the automobile.

My new tool fully accomplishes the objects and purposes stated, and it is to be understood that changes in the form, construction, arrangement, and combination of the several parts of my new tool may be made and substituted for those herein shown and described without departing from the nature and principle of my invention.

Having thus described my invention, what I claim and desire to secure by Letters Patent is:

1. A fender rolling tool including, in combination, a rigid frame for manual manipulation of the tool and comprising spaced first and second arms, a piece joining said arms at an end thereof, an extension upon the second arm presented towards the first arm, and an arcuate brace re-enforcingly joined to the first arm, the arms and said extension being adapted to embrace the fender therebetween and said extension having a recess in its free end, a screw threaded for adjustment in the free end of the first arm in alining relation with said extension, a recessed bracket swiveled intermediate the arms upon the lower end of the screw, means for retaining the bracket against rotary movement relatively to the frame both during adjustments of said screw and working operations of the frame, a roller carried by and mounted for rotation in the recess of the bracket, and an opposed roller mounted for rotation in the recess of said extension, said rollers being adapted for engaging the opposite faces of the embraced fender.

2. A fender roller including, in combination, a rigid unitary frame for manual manipulation of the tool and comprising spaced first and second arms, a piece uniting said arms at an end thereof, an extension upon the second arm presented towards the first arm, and an arcuate brace re-enforcingly joined at its ends to the first arm, the arms and said extension being adapted to embrace the fender therebetween and said extension having a U-shaped recess in its free end, a screw threaded for adjustment in the free end of the first arm in alining relation with said extension, a bracket having a U-shaped recess swiveled intermediate the first arm and said extension upon the lower end of the screw, a bar attached at one end to the bracket and having slidable connection with the first arm for retaining the bracket against rotary movement relatively to the frame both during adjustments of the screw and working operations of the frame, a roller carried by and mounted for rotation in the recess of the bracket, and an opposed roller mounted for rotation in the recess of said extension, said rollers being adapted for engaging the opposite faces of the embraced fender.

In testimony whereof, I have signed my name to this specification.

HERMAN W. JOHNSON.